US010487157B2

(12) United States Patent
Kramer et al.

(10) Patent No.: US 10,487,157 B2
(45) Date of Patent: *Nov. 26, 2019

(54) METHODS FOR CHLORINATING POLYVINYL CHLORIDE

(71) Applicant: Oxy Vinyls, LP, Dallas, TX (US)

(72) Inventors: Keith S. Kramer, Andover, KS (US); Lance Mayer, Wichita, KS (US); Rodney L. Klausmeyer, Wichita, KS (US)

(73) Assignee: Oxy Vinyls, LP, Dallas, TX (US)

( * ) Notice: Subject to any disclaimer, the term of this patent is extended or adjusted under 35 U.S.C. 154(b) by 41 days.

This patent is subject to a terminal disclaimer.

(21) Appl. No.: 15/740,989

(22) PCT Filed: Mar. 7, 2017

(86) PCT No.: PCT/US2017/021138
§ 371 (c)(1),
(2) Date: Dec. 29, 2017

(87) PCT Pub. No.: WO2017/155983
PCT Pub. Date: Sep. 14, 2017

(65) Prior Publication Data
US 2018/0186905 A1    Jul. 5, 2018

Related U.S. Application Data

(60) Provisional application No. 62/305,112, filed on Mar. 8, 2016.

(51) Int. Cl.
| | | |
|---|---|---|
| *C08L 27/06* | (2006.01) |
| *C08F 8/22* | (2006.01) |
| *C08K 5/053* | (2006.01) |
| *C08J 3/28* | (2006.01) |
| *C08K 5/02* | (2006.01) |
| *C08L 1/28* | (2006.01) |
| *C08L 29/04* | (2006.01) |
| *C08L 71/02* | (2006.01) |

(52) U.S. Cl.
CPC .................. *C08F 8/22* (2013.01); *C08J 3/28* (2013.01); *C08K 5/02* (2013.01); *C08K 5/053* (2013.01); *C08L 1/284* (2013.01); *C08L 27/06* (2013.01); *C08L 29/04* (2013.01); *C08L 71/02* (2013.01)

(58) Field of Classification Search
CPC .......... C08F 8/22; C08F 114/16; C08L 71/02; C08L 27/06; C08L 29/04; C08L 1/284; C08K 5/053; C08K 5/02; C08J 3/28
See application file for complete search history.

(56) References Cited

U.S. PATENT DOCUMENTS

| | | | |
|---|---|---|---|
| 2,426,080 | A | 8/1947 | Chapman et al. |
| 2,996,489 | A | 8/1961 | Dannis et al. |
| 3,100,762 | A | 8/1963 | Shockney |
| 3,334,077 | A | 8/1967 | George |
| 3,532,612 | A | 10/1970 | Weben et al. |
| 3,632,848 | A | 1/1972 | Young et al. |
| 3,670,056 | A | 6/1972 | Heiberger et al. |
| 4,331,775 | A | 5/1982 | Hall |
| 4,377,459 | A | 3/1983 | Parker |
| 4,412,898 | A | 11/1983 | Olson et al. |
| 4,487,899 | A | 12/1984 | White |
| 5,006,607 | A | 4/1991 | Sharaby et al. |
| 6,197,895 | B1 | 3/2001 | Suzuki et al. |
| 6,277,922 | B1 | 8/2001 | Sharaby et al. |
| 6,590,041 | B1 | 7/2003 | Eguchi et al. |
| 7,572,389 | B2 | 8/2009 | Fokken et al. |
| 2006/0094808 | A1 | 5/2006 | Kim et al. |
| 2018/0194875 | A1* | 7/2018 | Kramer et al. ......... C08F 6/008 |

FOREIGN PATENT DOCUMENTS

| | | |
|---|---|---|
| CN | 1401672 A | 3/2003 |
| EP | 0421150 A2 | 4/1991 |
| JP | 04-106110 A | 4/1992 |
| JP | H04106110 A | 4/1992 |
| JP | 11-100411 A | 4/1999 |
| JP | 11-124407 A | 5/1999 |
| JP | 2000-136213 A | 5/2000 |
| JP | 2002-030111 A | 1/2002 |
| JP | 2002030111 A | 1/2002 |
| WO | 2016012937 A1 | 1/2016 |

OTHER PUBLICATIONS

International Search Report dated Jul. 18, 2017 for corresponding PCT/US2017/021138.

* cited by examiner

*Primary Examiner* — Nathan M Nutter
(74) *Attorney, Agent, or Firm* — Renner, Kenner; Arthur M. Reginelli (57) ABSTRACT

A method for chlorinating polyvinyl chloride, the method comprising providing polyvinyl chloride particles having a chlorination accelerant associated therewith, where the particles are suspended in water; and chlorinating the polyvinyl chloride particles having a chlorination accelerant associated therewith.

14 Claims, 2 Drawing Sheets

METHODS FOR CHLORINATING POLYVINYL CHLORIDE

This application is a National-Stage application of PCT/US2017/021138 filed on Mar. 7, 2017, which claims the benefit of U.S. Provisional Application Ser. 62/305,112, filed on Mar. 8, 2016, which are incorporated herein by reference.

TECHNICAL FIELD

Embodiments of the invention are directed toward methods for chlorinating polyvinyl chloride. According to one or more aspects of the invention, the chlorination rate is increased by associating the polyvinyl chloride with a chlorination accelerant prior to the chlorination reaction.

BACKGROUND

Chlorinated polyvinyl chloride (CPVC) offers advantages over polyvinyl chloride. For example, chlorinated polyvinyl chloride can withstand water at temperatures greater than 60° C. to 70° C. or higher, which is an advantage over polyvinyl chloride, and thus makes chlorinated polyvinyl chloride suitable for use as a material for water piping systems in residential and commercial construction. Chlorinated polyvinyl chloride also has greater resistance to many chemicals.

Chlorination of polyvinyl chloride resin to produce chlorinated polyvinyl chloride is generally known in the art. Chlorinated polyvinyl chloride can be made via a free radical chlorination reaction of polyvinyl chloride particles. The reaction can occur via a radically initiated reaction wherein a chlorine radical adds to the polyvinyl chloride. For example, chlorine gas can be decomposed into free radical chlorine by UV light, and the radical chlorine is then reacted with polyvinyl chloride resin, essentially replacing a portion of the hydrogen in the polyvinyl chloride molecule with chlorine.

There have been prior art efforts directed to improving the synthesis of chlorinated polyvinyl chloride. For example, U.S. Pat. No. 2,996,489 discloses the use of a swelling or wetting agent, such as a chlorinated hydrocarbon to improve diffusion of the chlorine through the polyvinyl chloride polymer particle. Similarly, U.S. Pat. No. 3,334,077 discloses a method of chlorinating polyvinyl chloride resin in an aqueous medium containing an organic swelling agent for the polyvinyl chloride resin, where the chlorination reaction is conducted in the presence of an acrylic acid polymer.

The prior art has further recognized the problem of relatively slow chlorination rates of vinyl chloride resins. For example, U.S. Pat. No. 3,100,762 describes obtaining faster chlorination than proposed in U.S. Pat. No. 2,996,489 by conducting the chlorination at elevated temperature and pressure in the presence of a swelling agent, and in the absence of photo-illumination. It is suggested that neither catalyst nor photo-illumination is required under the prescribed conditions of temperature and pressure if oxygen is substantially excluded from the reactor. Significantly, however, inferior chlorinated products are obtained under these reaction conditions when the chloromethane swelling agent is omitted from the reaction mixture.

In a further effort to improve chlorination rates, U.S. Pat. No. 4,412,898 discloses photo-chlorination of polyvinyl chloride particles in an aqueous suspension without the use of swelling agents by employing elevated pressure and temperature.

Despite improvements that have been made, there remains a desire to improve the chlorination rate of PVC.

SUMMARY

One or more embodiments of the present invention provide a method for chlorinating polyvinyl chloride, the method comprising providing polyvinyl chloride particles having a chlorination accelerant associated therewith, where the particles are suspended in water; and chlorinating the polyvinyl chloride particles having a chlorination accelerant associated therewith.

DETAILED DESCRIPTION

Embodiments of the invention are based, at least in part, on the discovery of a process for chlorinating polyvinyl chloride by reacting chlorine with polyvinyl chloride, wherein the polyvinyl chloride is in the form of particles that have been associated with a chlorination accelerant. It has unexpectedly been discovered that the chlorination rate is increased when the polyvinyl chloride particles are first associated with the chlorination accelerant. Advantageously, the chlorination accelerant can be associated with the polyvinyl chloride particles within the same aqueous suspension in which the chlorination reaction takes place.

PVC Particles

Embodiments of the invention are not limited by the PVC particles that may be chlorinated according to embodiments of this invention. Accordingly, practice of this invention may employ those PVC particles that are produced by conventional procedures. In this regard, U.S. Pat. Nos. 2,662,867; 4,081,248; 4,487,899; 4,797,443; 5,155,189; 5,157,076; and 5,244,995 are incorporated herein by reference.

In one or more embodiments, dried PVC particles 42, which are associated with a chlorination accelerant, may be characterized by a median particle size that is greater than 30 μm, in other embodiments greater than 50 μm, in other embodiments greater than 70 μm, in other embodiments greater than 90 μm, in other embodiments greater than 110 μm, and in other embodiments greater than 130 μm. In these or other embodiments, PVC 42 particles may be characterized by a median particle size that is less than 900 μm, in other embodiments less than 750 μm, and in other embodiments less than 500 μm. In one or more embodiments, PVC particles 42 may be characterized by a median particle size of from about 30 to about 900 μm, in other embodiments from about 50 to about 750 μm, in other embodiments from about 70 to about 500 μm, in other embodiments from about 90 to about 500 μm, and in other embodiments from about 110 to about 500 μm. As the skilled person appreciates, the particle size of the PVC may be determined by laser diffraction analysis.

In one or more embodiments, dried PVC particles 42, which are associated with a chlorination accelerant, may be characterized by a porosity, as measured by ASTM D 3367-75, that is greater than 0.18, in other embodiments greater than 0.19, and in other embodiments greater than 0.20 cc/g. In these or other embodiments, PVC particles 42 may be characterized by a porosity of less than 0.48, in other embodiments less than 0.46, in other embodiments less than 0.44 cc/g, in other embodiments less than 0.42, in other embodiments less than 0.40 cc/g. in other embodiments less than 0.38, and in other embodiments less than 0.36 cc/g. In one or more embodiments, PVC particles 42 may be characterized by a porosity of from about 0.18 to about 0.48, in other embodiments from about 0.19 to about 0.46, and in other embodiments from about 0.20 to about 0.44 cc/g.

In one or more embodiments, dried PVC particles 42, which are associated with a chlorination accelerant, may be characterized by an inherent viscosity, as measured by ASTM D 1243-79 (1984), that is greater than 0.46, in other embodiments greater than 0.50, and in other embodiments greater than 0.55 dl/g. In these or other embodiments, PVC 42 particles may be characterized by an inherent viscosity of less than 1.55, in other embodiments less than 1.40, and in other embodiments less than 1.15 dl/g. In one or more embodiments, PVC 42 particles may be characterized by an inherent viscosity of from about 0.46 to about 1.55, in other embodiments from about 0.50 to about 1.40, and in other embodiments from about 0.55 to about 1.15 dl/g.

Process Overview

Figure 1:
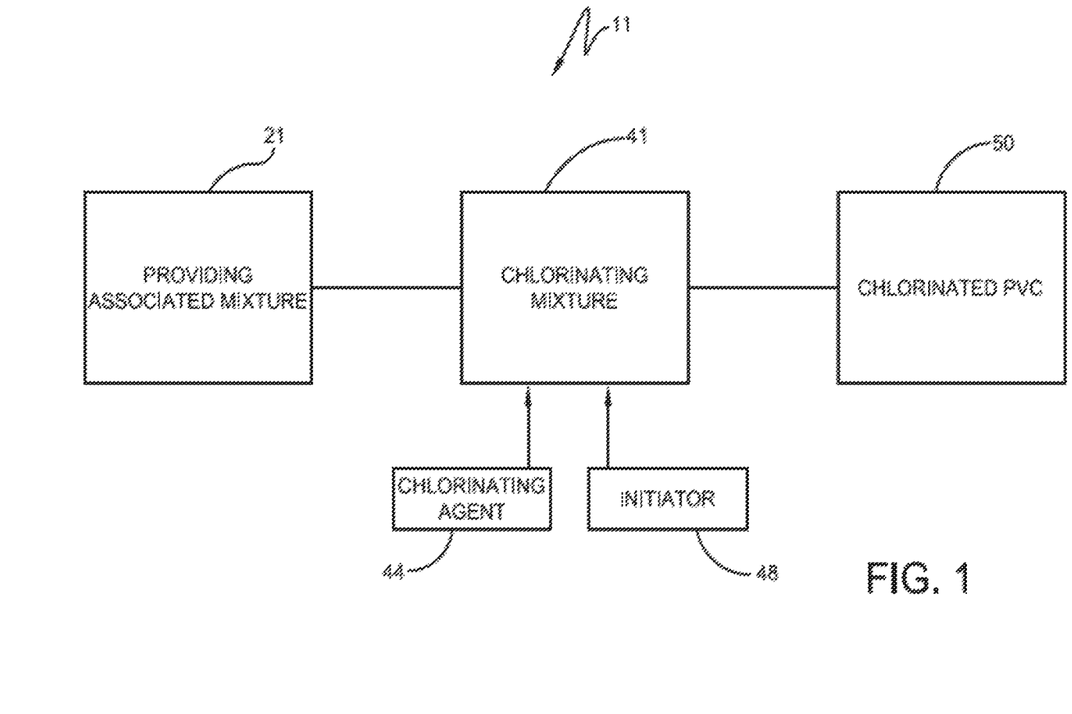
FIG. 1 is a flow chart showing one or more methods of the present invention.

One or more embodiments of the present invention can be described with reference to FIG. 1, which shows chlorination process 11 including a step 21 of providing an aqueous suspension of polyvinyl chloride particles (which may be referred to as PVC particles) having a chlorination accelerant associated therewith. The PVC particles within this suspension are then chlorinated within a subsequent chlorination reaction 41. As will be described in greater detail below, step 21 of providing an aqueous suspension of PVC particles can include combining PVC particles with water and the accelerant. Or, in other embodiments, it may include starting with a PVC particle that has been combined with the accelerant. In any event, once the aqueous suspension of PVC particles is provided, which includes PVC particles associated with an accelerant, the PVC particles are chlorinated within a chlorination step 41, which includes the addition of chlorination agent 44 to the aqueous suspension and the input of an initiator 48. Chlorinated PVC particles 50 result from the process.

Aqueous Suspension of PVC

According to embodiments of this invention, an aqueous suspension of PVC particles includes PVC particles suspended in water. In one or more embodiments, the suspension is maintained (i.e. the particles are inhibited from appreciably coalescing) by agitating the aqueous suspension.

In one or more embodiments, the aqueous suspension of PVC particles has a water to polymer weight ratio of at least 0.9:1, in other embodiments at least 1.0:1, in other embodiments at least 1.3:1, and in other embodiments at least 1.5:1. In these or other embodiments, the aqueous suspension of PVC particles has a water to polymer weight ratio of at most 20:1, in other embodiments at most 10:1, in other embodiments at most 7:1, and in other embodiments at most 5:1. In one or more embodiments, the aqueous suspension of PVC particles has a water to polymer weight ratio of from about 0.9:1 to about 20:1, in other embodiments from about 1:1 to about 10:1, in other embodiments from about 1.3:1 to about 7:1, and in other embodiments from about 1.5:1 to about 5:1.

In one or more embodiments, the PVC particles within the suspension may be characterized by a median particle size that is greater than 30 Atm, in other embodiments greater than 50 μm, in other embodiments greater than 70 μm, in other embodiments greater than 90 μm, in other embodiments greater than 110 μm, and in other embodiments greater than 130 Atm. In these or other embodiments, the PVC particles within suspension may be characterized by a median particle size that is less than 900 μm, in other embodiments less than 750 μm, and in other embodiments less than 500 μm. In one or more embodiments, the PVC particles within suspension may be characterized by a median particle size of from about 30 to about 900 μm, in other embodiments from about 50 to about 750 μm, and in other embodiments from about 90 to about 500 μm. As the skilled person appreciates, the particle size of the PVC may be determined by laser diffraction analysis.

In one or more embodiments, the aqueous suspension of PVC particles, including the PVC particles themselves, are substantially devoid of vinyl chloride monomer. As used within this specification, substantially devoid refers to that amount or less of vinyl chloride monomer that has no appreciable impact on the composition or process of this invention. In one or more embodiments, the aqueous suspension of PVC particles includes less than 15, in other embodiments less than 10, and in other embodiments less than 8 parts by weight vinyl chloride monomer per million parts by weight PVC particles.

As suggested above, the chlorination accelerant is associated with the PVC particles. Without wishing to be bound by any particular theory, it is believed that the chlorination accelerant absorbs into and/or adsorbs onto the PVC particles. In one or more embodiments, the chlorination accelerant is not chemically bound to the PVC polymer or particles (i.e. not chemically incorporated). In one or more embodiments, the chlorination accelerant is substantially extractable from the PVC particles.

The amount of chlorination accelerant associated with the PVC particles can be quantified based upon the mass of the accelerant relative to the mass of the PVC particles. In one or more embodiments, the amount of accelerant present in the PVC suspension (i.e. associated with the PVC particle) is at least 50, in other embodiments at least 500, in other embodiments at least 750, in other embodiments at least 1000, and in other embodiments at least 1250 parts by weight accelerant per one million parts by weight PVC particles (ppm by weight relative to the weight of the PVC particles). In these or other embodiments, the amount of accelerant present in the PVC suspension is at most 10,000, in other embodiments at most 7,500, in other embodiments at most 5,000, and in other embodiments at most 2,500 ppm by weight relative to the PVC particles. In one or more embodiments, the amount of accelerant present in the PVC suspension is from about 50 to about 10,000, in other embodiments from about 500 to about 7,500, and in other embodiments from about 750 to about 5,000 ppm by weight relative to the weight of the PVC particles.

The chlorination accelerant includes those compounds that can be associated with the PVC particles to provide increased chlorination rates when the PVC particles are chlorinated. In one or more embodiments, the chlorination accelerant, which may also be referred to as a chlorinating accelerant, is a nonionic oligomer or polymer containing a hydroxyl group functionality attached to an aliphatic and/or ether-linked backbone. In one or more embodiments, the oligomer or polymer includes a backbone having at least 10, in other embodiments at least 15, and in other embodiments at least 20 carbon atoms. In these or other embodiments, the oligomer or polymer contains at least 1, in other embodiments at least 2, and in other embodiments at least 3 hydroxyl groups. In one or more embodiments, the chlorination accelerant is at least appreciably soluble in water.

Examples of useful chlorination accelerants include polyvinyl alcohol, partially hydrolyzed poly(vinyl acetate) homopolymer, partially hydrolyzed co-polymers of vinyl acetate and comonomer, heat-treated partially hydrolyzed poly(vinyl acetate) homopolymer, heat-treated partially hydrolyzed co-polymers of vinyl acetate and comonomer, polyethylene glycol, poly(alkylene) oxides (e.g. poly(ethylene) oxide and poly(propylene) oxide), hydroxypropyl cellulose, hydroxyethyl cellulose, hydroxypropyl methylcellulose, and water-soluble cellulose esters. The chlorination accelerant may include unsaturation. As the skilled person will appreciate, unsaturation, particularly in the case of poly(vinyl acetate), may derive from comonomer or through heat treatment of the polymer. Some useful chlorination accelerants are disclosed in U.S. Pat. Nos. 4,226,966, 7,070,731, and 8,222,325, and U.S. Publication Nos. 2010/0234508 and 2012/0309880, which are incorporated herein by reference.

In one or more embodiments, the chlorination accelerant (e.g. partially hydrolyzed poly(vinyl acetate)) may be characterized by having an average hydrolysis of greater than 60 mole %, in other embodiments greater than 70 mole %, in other embodiments greater than 72 mole %, in other embodiments greater than 80 mole %, in other embodiments greater than 85 mole %, in other embodiments greater than 90 mole %, in other embodiments greater than 95 mole %, and in other embodiments greater than 99 mole % hydrolyzed. In one or more embodiments, the chlorination accelerant (e.g. partially hydrolyzed poly(vinyl acetate)) may be characterized by having an average hydrolysis of less than 99.5 mole %, in other embodiments less than 99 mole %, in other embodiments less than 98 mole %, in other embodiments less than 95 mole %, in other embodiments less than 90 mole %, in other embodiments less than 85 mole %, in other embodiments less than 80 mole %, and in other embodiments less than 75 mole % hydrolyzed. In one or more embodiments, the chlorination accelerant (e.g. partially hydrolyzed poly(vinyl acetate)) may be characterized by having an average hydrolysis of from about 60 mole % to about 99.5 mole %, in other embodiments from about 70 mole % to about 98 mole %, and in other embodiments from about 70 mole % to about 80 mole % hydrolyzed.

In one or more embodiments, the chlorination accelerant (e.g. hydroxypropyl methylcellulose) may be characterized by having a hydroxypropoxyl content of from about 3 to about 15 weight %, and in other embodiments from about 5 to about 12 weight %. In one or more embodiments, the chlorination accelerant (e.g. hydroxypropyl methylcellulose) may be characterized by having a methoxyl content of from about 15 to about 35 weight %, and in other embodiments from about 18 to about 30 weight %.

In one or more embodiments, the suspension of PVC particles, including the PVC particles themselves, is devoid or substantially devoid of a PVC swelling agent. As a skilled person appreciates, swelling agents, within the context of this invention, include those compounds that are capable of solvating, expanding and/or opening the PVC particles to thereby promote diffusion of materials into the particles. In one or more embodiments, these swelling agents include halohydrocarbons. Specific examples of swelling agents include monochloromethane, dichloromethane, trichloromethane (chloroform), and tetrachloromethane (carbon tetrachloride). The term substantially devoid refers to that amount or less of swelling agent that does not have an appreciable impact on the composition or processes of this invention.

Chlorinating PVC Particles

As indicated above, the suspended PVC particles, which are associated with a chlorination accelerant, are chlorinated. This reaction may proceed by employing conventional techniques such as free-radical chlorination. In particular embodiments, known chlorination techniques can be employed such as those disclosed in U.S. Pat. No. 4,412,898, which is incorporated herein by reference.

For example, in one or more embodiments, a chlorinating agent, such as chlorine, can be dispersed in aqueous medium in which the PVC particles are likewise dispersed. It is believed that the chlorinating agent, or a derivative thereof, associates with the PVC particles either by absorption or adsorption. The reaction between the PVC and the chlorinating agent or derivative thereof is initiated by the introduction of an initiator such as a chemical, photochemical, or thermal initiator. For example, UV light is believed to decompose chlorine into free-radical chlorine, which then reacts with the PVC to produce chlorinated PVC In one or more embodiments, the amount of chlorinating agent (e.g. chlorine gas) introduced to the aqueous PVC suspension can be quantified based upon the weight of chlorine introduced relative to the weight of the PVC. In one or more embodiments, the amount of chlorine introduced to the PVC suspension is at least 20, in other embodiments at least 40, and in other embodiments at least 60 parts by weight chlorine per 100 parts per weight PVC particles. In these or other embodiments, the amount of chlorine present in the PVC suspension is at most 100, in other embodiments at most 90, and in other embodiments at most 80 parts by weight chlorine per 100 parts per weight PVC. In one or more embodiments, the amount of chlorine present in the PVC suspension is from about 20 to about 100, in other embodiments from about 40 to about 90, and in other embodiments from about 60 to about 80 parts by weight chlorine per 100 parts per weight PVC.

In those embodiments where UV light is employed to initiate the chlorination reaction, the UV light may be characterized by a wavelength of about 2000 to about 4000 angstroms.

In one or more embodiments, the chlorination reaction takes place at a temperature of at least 10, in other embodiments at least 20, and in other embodiments at least 30° C. In these or other embodiments, the chlorination reaction takes place at a temperature of at most 95, and in other embodiments at most 80, and in other embodiments at most 60° C. In one or more embodiments, the temperature at which the chlorination reaction takes place is from about 10 to about 95, in other embodiments from about 20 to about 80, and in other embodiments from about 30 to about 60° C.

Methods of Associating Accelerant and PVC Particles

As indicated above, the chlorination accelerant may advantageously be associated with PVC particles by employing several techniques. As a result, the advantageous benefits associated with this invention can be realized through multiple pathways.

In one or more embodiments, the chlorination accelerant is introduced to the aqueous medium in which the chlorination reaction takes place. Stated another way, the chlorination accelerant is introduced separately and individually to an aqueous medium. In one or more embodiments, the chlorination accelerant is associated with PVC particles suspended within this medium. In one or more embodiments, the chlorination reaction eventually takes place within this aqueous medium. For example, and with reference to FIG. 2, process 13 includes step 31 of combining (i.e. introducing) PVC particles 30, water 32, and chlorination accelerant 34 to thereby provide an aqueous suspension 38 (which may be referred to as a pre-associated suspension or mixture 38) of PVC particles. In these or other embodiments, step 31 includes agitating or otherwise introducing mechanical energy to the combined materials in order to form and/or facilitate formation of the PVC suspension. In one or more embodiments, the input of mechanical energy is continued in order to maintain the PVC in a suspended state.

In one or more embodiments, each of the constituents (e.g. PVC particles and chlorination accelerant) may be introduced in a stepwise manner. In other embodiments, the constituents may be combined simultaneously. In yet other embodiments, two or more of the constituents may be pre-combined. For example, in one or more embodiments, the PVC particles may be introduced to the water to form a pre-accelerant PVC suspension, and then the chlorination accelerant may be subsequently added to the pre-accelerant suspension.

The introduction of these constituents may take place in any appropriate vessel including, for example, reactors such as continuously-stirred reactors, as well as within various conduits or feedlines that may feed a larger reaction vessel and/or holding tank. As suggested above, in one or more embodiments, the constituents are combined to form a PVC suspension wherein the PVC particles are associated with a chlorination accelerant within the same vessel in which the chlorination reaction takes place. In other embodiments, the PVC particles and chlorination accelerant are combined in a first vessel to form a suspension, and then the chlorination reaction can be conducted in a second vessel.

Figure 2:
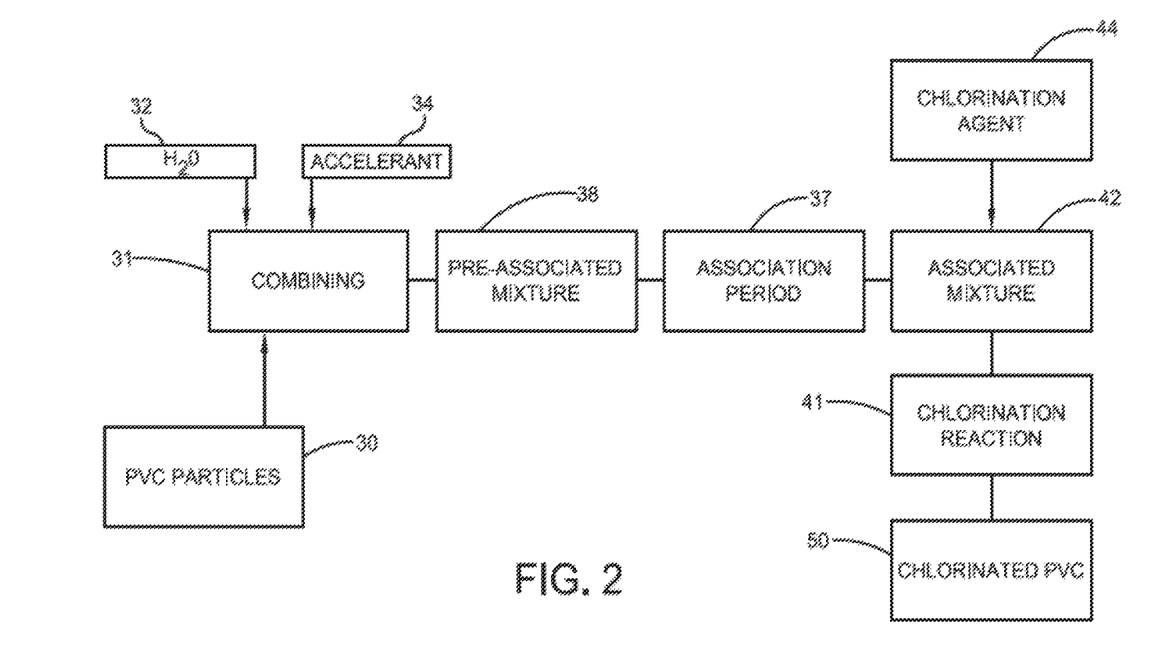
FIG. 2 is a flow chart showing one or more methods of the present invention including sub-embodiments for preparing a polyvinyl chloride suspension wherein a chlorination accelerant is associated with the polyvinyl chloride particles.

In one or more embodiments, after introducing the PVC particles with the chlorination accelerant within an aqueous medium (to thereby form the pre-associated suspension 38), a sufficient time is provided to allow the chlorination accelerant and the PVC particles to associate prior to the chlorination reaction within an association step 37, which thereby produces a suspension 42 wherein the PVC particles are associated with the accelerant (this suspension may also be referred to as an associated suspension or associated mixture 42). This time interval, which may be referred to as association time, is at least 10 minutes, in other embodiments at least 30 minutes, in other embodiments at least 60 minutes, and in other embodiments at least 6 hours. In one or more embodiments, the association time may be from about 10 minutes to about 24 hours, in other embodiments from about 30 minutes to about 12 hours, and in other embodiments from about 1 hour to about 10 hours.

In one or more embodiments, the association period may take place at a temperature of about 10 to about 95° C., in other embodiments from about 15 to about 70° C., and in other embodiments from about 20 to about 50. In these or other embodiments, the association period may take place at from about 0.2 to about 5 atmospheres, in other embodiments from about 0.5 to about 3 atmospheres, and in other embodiments from about 1 to about 2 atmospheres. In particular embodiments, the association period takes place at standard conditions of temperature and pressure.

As indicated above, associated mixture 42 can then be chlorinated within a chlorination step 41 to produce chlorinated PVC 50.

In order to demonstrate the practice of the present invention, the following examples have been prepared and tested. The examples should not, however, be viewed as limiting the scope of the invention. The claims will serve to define the invention.

EXPERIMENTAL

Example 1—Control

PVC particles characterized by a porosity of about 0.235 cc/g, an inherent viscosity of about 0.665 dl/g, and a median particle size (laser diffraction) of about 119 microns were provided and chlorinated. For purposes of this Experimental section, porosity was determined by employing techniques equivalent to ASTM D3367-75 and inherent viscosity was determined by employing techniques equivalent to ASTM D1243-79 (1984), with both methods being modified to achieve technological efficiencies.

The PVC particles were chlorinated to produce chlorinated polyvinyl chloride (CPVC) according to the following procedure. Thirty grams of the PVC particles and 500 grams of distilled water were charged to a one-liter, glass, photo-chlorination reactor. Rapid stirring produced an aqueous suspension of the PVC particles. Nitrogen gas was sparged into the slurry overnight using a thermal mass flow controller to remove oxygen from the system. The nitrogen sparging was about two inches below the surface of the liquid. After the overnight nitrogen purge, the reactor and contents were heated to 40° C. Once the temperature stabilized, nitrogen flow was stopped and chlorine gas was started. Chlorine gas was sparged into, and through, the slurry at a rate from 10.3 to 11.0 grams per hour. The chlorine sparging was about two inches below the surface of the liquid.

After one hour of chlorine gas sparging, a UV lamp was illuminated to initiate chlorination of the PVC particles. The UV lamp was a jacketed UV lamp well positioned about one-fourth inch above the surface of the liquid. A 450-watt medium pressure Ace 7825 immersion UV lamp occupied the lamp well. Based on the one hour timeframe, the water and polyvinyl chloride resin slurry were fully saturated with chlorine before being irradiated with UV light.

Chlorine evolution from the solution was continuously monitored by sparging the reactor vent into a caustic solution. The amount of chlorine reacted with the PVC particles at any given time was determined by subtracting the amount of chlorine recovered in the vent from the amount fed.

Other details of the procedure included: tempered water from constant-temperature baths circulated through the reactor and lamp well jackets; vent gases exited through a water-cooled condenser to help return any entrained liquid to the reactor, then passed into a gas absorption bottle containing a solution of approximately seven percent NaOH in water; the absorption bottle rested on a digital laboratory balance which allowed continuous measurement of weight gain, and thus the rate of chlorine evolution from the reactor; and the reactor was wrapped with aluminum foil and fiberglass insulation.

Chlorine gas sparge flow was 10.9 grams per hour. From multiple trials it was determined that 12.0 grams of chlorine reacted with the resin in an average of 5.67 hours. The reaction of 12.0 grams of chlorine with 30.0 grams of polyvinyl chloride represented a final chlorine content in the chlorinated polyvinyl chloride resin of 64.24 percent. As a control sample, the chlorination rate was taken as a 100% reference point as set forth in the Table.

TABLE

| Example # | Accelerant Amount (PPM) | Accelerant Type | Rate (%) |
|---|---|---|---|
| 1 | 0 | N/A | 100 |
| 2 | 1040 | PVA | 108 |
| 3 | 0 | N/A | 100 |
| 4 | 105 | PVA | 109 |
| 5 | 225 | PVA | 115 |
| 6 | 1000 | PVA | 117 |
| 7 | 4970 | PVA | 118 |
| 8 | 1010 | HPMC | 114 |
| 9 | 1990 | HPMC | 123 |
| 10 | 1100 | SLS | 81 |
| 11 | 0 | N/A | 100 |
| 12 | 1100 | PVA | 125 |
| 13 | 1000 | HPMC | 134 |
| 14 | 1000 | SLS | 39 |
| 15 | 0 | N/A | 100 |
| 16 | 1005 | PVA | 121 |
| 17 | 1000 | Prop Glycol | 104 |
| 18 | 1000 | PEG 200 ovnt | 114 |
| 19 | 1000 | PEG 200 late | 105 |
| 20 | 1000 | PEG 8000 | 115 |
| 21 | 1000 | 98% PVA | 115 |
| 22 | 1000 | Lauryl Alc | 100 |
| 23 | 1000 | HDTMAB | 46 |
| 24 | 1000 | DOSS | 39 |
| 25 | 1000 | Carbopol | 91 |

Example 2

An aqueous suspension of the PVC particles was prepared as provided in Example 1, except 0.57 grams of an aqueous solution containing 5.48 weight percent hydrolyzed poly(vinyl acetate) (PVA) (about 72% average hydrolysis) was added to the suspension as a chlorination accelerant. Chlorination was then conducted using similar procedures as provided in Example 1. A layer of foam approximately one-fourth to one-half inch thick was present on the surface of the liquid when the nitrogen purge was initiated. After the overnight purge, the foam layer was no longer present.

Chlorine gas sparge flow was 10.9 grams per hour. In a single trial, 12.0 grams of chlorine reacted in 5.23 hours. This rate was thus 108 percent of that in Example 1 as reported in the Table.

Example 3—Control

PVC particles characterized by a porosity of about 0.262 cc/g, an inherent viscosity of about 0.922 dl/g, and a median particle size (laser diffraction) of about 129 microns were provided, suspended in water, and chlorinated using a chlorination procedure similar to that provided in Example 1.

Chlorine gas sparge flow was 10.5 grams per hour. From multiple trials it was determined that 12.0 grams of chlorine reacted with the resin in an average of 3.04 hours. As a control sample, the chlorination rate was taken as a 100% reference point as set forth in the Table.

Example 4

An aqueous suspension of the PVC particles was prepared as provided in Example 3, except 0.06 grams of an aqueous solution containing 5.25 weight percent hydrolyzed poly(vinyl acetate) (PVA) (about 72% average hydrolysis) was added to the suspension as a chlorination accelerant. Chlorination was then conducted using similar procedures as provided in Example 1. No foam was present on the surface of the liquid when the nitrogen purge was initiated.

Chlorine gas sparge flow was 10.7 grams per hour. In a single trial, 12.0 grams of chlorine reacted in 2.77 hours. The chlorination rate was thus 109 percent of that in Example 3.

Example 5

An aqueous suspension of the PVC particles was prepared as provided in Example 3, except 0.13 grams of an aqueous solution containing 5.25 weight percent hydrolyzed poly(vinyl acetate) (PVA) (about 72% average hydrolysis) was added to the suspension as a chlorination accelerant. Chlorination was then conducted using similar procedures as provided in Example 1. A layer of foam approximately one-fourth to one-half inch thick was present on the surface of the liquid when the nitrogen purge was initiated. After the overnight purge, the foam layer was no longer present.

Chlorine gas sparge flow was 10.7 grams per hour. In a single trial, 12.0 grams of chlorine reacted with the resin in 2.58 hours. The chlorination rate was thus 115 percent of that in Example 3.

Example 6

An aqueous suspension of the PVC particles was prepared as provided in Example 3, except 0.57 grams of an aqueous solution containing 5.25 weight percent hydrolyzed poly(vinyl acetate) (PVA) (about 72% average hydrolysis) was added to the suspension as a chlorination accelerant. Chlorination was then conducted using similar procedures as provided in Example 1. A layer of foam approximately one-fourth to one-half inch thick was present on the surface of the liquid when the nitrogen purge was initiated. After the overnight purge, the foam layer was no longer present.

Chlorine gas sparge flow was 10.7 grams per hour. In multiple trials 12.0 grams of chlorine reacted with the resin in an average of 2.53 hours. The average chlorination rate was thus 117 percent of that in Example 3 as reported in the Table.

Example 7

An aqueous suspension of the PVC particles was prepared as provided in Example 3, except 2.84 grams of an aqueous solution containing 5.25 weight percent hydrolyzed poly(vinyl acetate) (PVA) (about 72% average hydrolysis) was added to the suspension as a chlorination accelerant. Chlorination was then conducted using similar procedures as provided in Example 1. A layer of foam approximately one-half inch thick was present on the surface of the liquid when the nitrogen purge was initiated. After the overnight purge, the foam layer was nearly dissipated.

Chlorine gas sparge flow was 10.6 grams per hour. In a single trial, 12.0 grams of chlorine reacted with the resin in 2.48 hours. The chlorination rate was thus 118 percent of that in Example 3 as reported in the Table.

Example 8

An aqueous suspension of the PVC particles was prepared as provided in Example 3, except a 0.91 grams of an aqueous solution containing 3.33 weight percent hydroxypropylmethyl cellulose (HPMC) (hydroxypropoxyl content between 5 and 12 weight % and a methoxyl content between 18 and 29%) was added to the suspension as a chlorination accelerant. Chlorination was then conducted using similar procedures as provided in Example 1. A layer of foam approximately one-eighth inch thick was present on the surface of the liquid when the nitrogen purge was initiated. After the overnight purge, the foam layer was nearly dissipated.

Chlorine gas sparge flow was 10.5 grams per hour. In a single trial, 12.0 grams of chlorine reacted with the resin in 2.62 hours. The chlorination rate was thus 114 percent of that in Example 3 as reported in the Table.

Example 9

An aqueous suspension of the PVC particles was prepared as provided in Example 3, except 1.79 grams of an aqueous solution containing 3.33 weight % hydroxypropylmethyl cellulose (HPMC) (hydroxypropoxyl content between 5 and 12 weight % and a methoxyl content between 18 and 29%) was added to the suspension as a chlorination accelerant. Chlorination was then conducted using similar procedures as provided in Example 1. A layer of foam approximately one-fourth inch thick was present on the surface of the liquid when the nitrogen purge was initiated. After the overnight purge, the foam layer was still approximately one-eighth inch thick.

Chlorine gas sparge flow was 10.9 grams per hour. In a single trial, 12.0 grams of chlorine reacted with the resin in 2.35 hours. The chlorination rate was thus 123 percent of that in Example 3 as reported in the Table.

Example 10—Comparative Example

An aqueous suspension of the PVC particles was prepared as provided in Example 3, except 0.11 grams of an aqueous solution containing 30.1 weight percent sodium lauryl sulfate (SLS) was added to the suspension as a chlorination accelerant. Chlorination was then conducted using similar procedures as provided in Example 1. A layer of foam approximately one-eighth inch thick was present on the surface of the liquid when the nitrogen purge was initiated, but disappeared after thirty minutes.

Chlorine gas sparge flow was 10.5 grams per hour. In multiple trials, 12.0 grams of chlorine reacted with the resin in an average of 3.62 hours. The average chlorination rate was thus 81 percent of that in Example 3 as reported in the Table.

Example 11—Control

PVC particles characterized by a porosity of about 0.316 cc/g, an inherent viscosity of about 0.945 dl/g, and a median particle size (laser diffraction) of about 146 microns were provided, suspended in water, and chlorinated using a chlorination procedure similar to that provided in Example 1.

Chlorine gas sparge flow was 10.7 grams per hour. In multiple trials, 12.0 grams of chlorine reacted with the resin in an average of 2.53 hours. The reaction of 12.0 grams of chlorine with 30.0 grams of PVC represents a final chlorine content in the CPVC resin of 64.24 percent. As a control sample, the chlorination rate was taken as a 100% reference point.

Example 12

An aqueous suspension of the PVC particles was prepared as provided in Example 11, except 0.56 grams of an aqueous solution containing 5.25 weight percent hydrolyzed poly(vinyl acetate) (PVA) (about 72% average hydrolysis) was added to the suspension as a chlorination accelerant. Chlorination was then conducted using similar procedures as provided in Example 1. A layer of foam approximately one-fourth inch thick was present on the surface of the liquid when the nitrogen purge was initiated. After the overnight purge, the foam layer was nearly dissipated.

Chlorine gas sparge flow was 10.9 grams per hour. In a single trial, 12.0 grams of chlorine reacted with the resin in 1.90 hours. The average chlorination rate was thus 125 percent of that in Example 11.

Example 13

An aqueous suspension of the PVC particles was prepared as provided in Example 11, except 0.90 grams of an aqueous solution containing 3.33 weight percent hydroxypropylmethyl cellulose (HPMC) (hydroxypropoxyl content between 5 and 12 weight % and a methoxyl content between 18 and 29%) was added to the suspension as a chlorination accelerant. Chlorination was then conducted using similar procedures as provided in Example 1. A layer of foam approximately one-fourth to one-half inch thick was present on the surface of the liquid when the nitrogen purge was initiated. After the overnight purge, the foam layer was still approximately one-eighth inch thick.

Chlorine gas sparge flow was 10.5 grams per hour. In a single trial, 12.0 grams of chlorine reacted with the resin in 1.68 hours. The chlorination rate was thus 134 percent of that in Example 11.

Example 14—Comparative Example

An aqueous suspension of the PVC particles was prepared as provided in Example 11, except 0.10 grams of an aqueous solution containing 30.1 weight percent sodium lauryl sulfate (SLS) was added to the suspension as a chlorination accelerant. Chlorination was then conducted using similar procedures as provided in Example 1. A layer of foam approximately one-eighth inch thick was present on the surface of the liquid when the nitrogen purge was initiated, but disappeared after fifteen minutes.

Chlorine gas sparge flow was 10.8 grams per hour. In a single trial, 12.0 grams of chlorine reacted with the resin in 4.08 hours. The chlorination rate was thus 39 percent of that in Example 11.

Example 15—Control

PVC particles characterized by a porosity of about 0.316 cc/g, an inherent viscosity of about 0.945 dl/g, and a median particle size (laser diffraction) of about 146 microns were provided, suspended in water, and chlorinated using a chlorination procedure similar to that provided in Example 1.

Chlorine gas sparge flow was 10.7 grams per hour. In multiple trials 12.0 grams of chlorine reacted with the resin in an average of 2.19 hours. The reaction of 12.0 grams of chlorine with 30.0 grams of PVC represents a final chlorine content in the CPVC resin of 64.24 percent. As a control sample, the chlorination rate was taken as a 100% reference point as provided in the Table.

Example 16

An aqueous suspension of the PVC particles was prepared as provided in Example 11, except 0.55 grams of an aqueous solution containing 5.48 weight percent hydrolyzed poly(vinyl acetate) (PVA) (about 72% average hydrolysis) was added to the suspension as a chlorination accelerant. Chlorination was then conducted using similar procedures as provided in Example 1. A layer of foam approximately one-fourth inch thick was present on the surface of the liquid when the nitrogen purge was initiated. After the overnight purge, the foam layer was no longer present.

Chlorine gas sparge flow was 10.9 grams per hour. In a single trial, 12.0 grams of chlorine reacted with the resin in 1.74 hours. The average chlorination rate was thus 121 percent of that in Example 15.

Example 17

An aqueous suspension of the PVC particles was prepared as provided in Example 15, except 0.03 grams of propylene glycol (Prop Glycol) was added to the suspension as a chlorination accelerant. Chlorination was then conducted using similar procedures as provided in Example 1. No foam was present on the surface of the liquid when the nitrogen purge was initiated.

Chlorine gas sparge flow was 10.7 grams per hour. In a single trial, 12.0 grams of chlorine reacted with the resin in 2.11 hours. The average chlorination rate was thus 104 percent of that in Example 15.

Example 18

An aqueous suspension of the PVC particles was prepared as provided in Example 15, except 0.03 grams of polyethylene glycol (average molecular weight 200) (PEG 200 ovnt) was added to the suspension as a chlorination accelerant. Chlorination was then conducted using similar procedures as provided in Example 1. No foam was present on the surface of the liquid when the nitrogen purge was initiated.

Chlorine gas sparge flow was 10.9 grams per hour. In a single trial, 12.0 grams of chlorine reacted with the resin in 1.88 hours. The average chlorination rate was thus 114 percent of that in Example 15.

Example 19

An aqueous suspension of the PVC particles was prepared as provided in Example 15, except following the overnight nitrogen purge, the next morning the reactor and contents were heated to 40° C., then 0.03 grams polyethylene glycol (average molecular weight 200) (PEG 200 late) was added to the suspension as a chlorination accelerant. Chlorination was then conducted using similar procedures as provided in Example 1. No foam was present on the surface of the liquid when the nitrogen purge was initiated.

Chlorine gas sparge flow was 10.8 grams per hour. In a single trial, 12.0 grams of chlorine reacted with the resin in 2.09 hours. The chlorination rate was thus 105 percent of that in Example 15. Compared to Example 18, this showed that the beneficial effect of adding polyethylene glycol was greater when the accelerant was added to the PVC slurry and allowed to stir overnight.

Example 20

An aqueous suspension of the PVC particles was prepared as provided in Example 15, except 0.03 grams of polyethylene glycol (average molecular weight 8000) (PEG 8000) was added to the suspension as a chlorination accelerant. Chlorination was then conducted using similar procedures as provided in Example 1. A layer of foam approximately one-sixteenth inch thick was present on the surface of the liquid when the nitrogen purge was initiated.

Chlorine gas sparge flow was 10.9 grams per hour. In multiple trials, 12.0 grams of chlorine reacted with the resin in an average of 1.87 hours. The average chlorination rate was thus 115 percent of that in Example 15 as reported in the Table.

Example 21

An aqueous suspension of the PVC particles was prepared as provided in Example 15, except 0.03 grams of an aqueous solution containing about 98 weight percent hydrolyzed poly(vinyl acetate) (about 72% average hydrolysis) (98% PVA) was added to the suspension as a chlorination accelerant. Chlorination was then conducted using similar procedures as provided in Example 1. No foam was present on the surface of the liquid when the nitrogen purge was initiated.

Chlorine gas sparge flow was 10.8 grams per hour. In a single trial, 12.0 grams of chlorine reacted with the resin in 1.86 hours. The average chlorination rate was thus 115 percent of that in Example 15 as reported in the Table.

Example 22—Comparative Example

An aqueous suspension of the PVC particles was prepared as provided in Example 15, except 0.03 grams of lauryl alcohol (Lauryl Alc) was added to the suspension as a chlorination accelerant. Chlorination was then conducted using similar procedures as provided in Example 1. No foam was present on the surface of the liquid when the nitrogen purge was initiated.

Chlorine gas sparge flow was 10.8 grams per hour. In a single trial, 12.0 grams of chlorine reacted with the resin in 2.19 hours. The average chlorination rate was thus 100 percent of that in Example 15.

Example 23—Comparative Example

An aqueous suspension of the PVC particles was prepared as provided in Example 15, except 0.03 grams hexadecyltrimethylammonium bromide (HDTMAB) was added to the suspension as a chlorination accelerant. Chlorination was then conducted using similar procedures as provided in Example 1. A layer of foam approximately one-eighth inch thick was present on the surface of the liquid when the nitrogen purge was initiated. After the overnight purge, the foam layer was no longer present.

Chlorine gas sparge flow was 11.0 grams per hour. In a single trial, 12.0 grams of chlorine reacted with the resin in 3.38 hours. The average chlorination rate was thus 46 percent of that in Example 15.

Example 24—Comparative Example

An aqueous suspension of the PVC particles was prepared as provided in Example 15, except 0.03 grams of a sodium salt of dioctylsulfosuccinate (DOSS) was added to the suspension as a chlorination accelerant. Chlorination was then conducted using similar procedures as provided in Example 1. A layer of foam approximately one-fourth to one-half inch thick was present on the surface of the liquid when the nitrogen purge was initiated. After the overnight purge, the foam layer was no longer present.

Chlorine gas sparge flow: 11.0 grams per hour. In a single trial, 12.0 grams of chlorine reacted with the resin in 3.52 hours. The average chlorination rate was thus 39 percent of that in Example 15.

Example 25—Comparative Example

An aqueous suspension of the PVC particles was prepared as provided in Example 15, except 30.0 grams of an aqueous solution containing 0.1 weight percent of a polyacrylic acid obtained under the tradename Carbopol 942 (Carbopol) was added to the suspension as a chlorination accelerator. Chlorination was then conducted using similar procedures as provided in Example 1. No foam was present on the surface of the liquid when the nitrogen purge was initiated.

Chlorine gas sparge flow was 10.8 grams per hour. In a single trial, 12.0 grams of chlorine reacted with the resin in 2.39 hours. The average chlorination rate was thus 91 percent of that in Example 15.

All references cited herein are hereby incorporated by reference in their entireties. A number of embodiments of the invention have been described. Nevertheless, it will be understood that various modifications may be made without departing from the spirit and scope of the invention. Accordingly, other embodiments are within the scope of the following claims.

What is claimed is:

1. A method for chlorinating polyvinyl chloride, the method comprising:
   a) providing an aqueous suspension of polyvinyl chloride particles, where the aqueous suspension is substantially devoid of vinyl chloride monomer;
   b) associating a chlorination accelerant with the polyvinyl chloride particles to thereby form polyvinyl chloride particles having a chlorination accelerant associated therewith; and
   c) chlorinating the polyvinyl chloride particles having a chlorination accelerant associated therewith.

2. The method of the preceding claim, where said step of chlorinating takes place in the substantial absence of a swelling agent.

3. The method of claim 1, where said step of chlorinating takes place in the substantial absence of a liquid-phase, halohydrocarbon compound.

4. The method of claim 1, where the chlorinating accelerant is selected from the group consisting of polyvinyl alcohol, partially hydrolyzed poly(vinyl acetate) homopolymer, partially hydrolyzed co-polymers of vinyl acetate and comonomer, heat-treated partially hydrolyzed poly(vinyl acetate) homopolymer, heat-treated partially hydrolyzed co-polymers of vinyl acetate and comonomer, polyethylene glycol, poly(alkylene) oxides, hydroxypropyl cellulose, hydroxyethyl cellulose, hydroxypropyl methylcellulose, and water-soluble cellulose esters.

5. The method of claim 1, where the polyvinyl chloride resin particles having a chlorinating accelerant associated therewith includes polyvinyl chloride resin particles having a chlorinating accelerant absorbed into and/or adsorbed onto the particles.

6. The method of claim 1, where the polyvinyl chloride resin particles having a chlorinating accelerant associated therewith includes at least 50 ppm by weight accelerant relative to the weight of the particles.

7. The method of claim 1, where the polyvinyl chloride resin particles having a chlorinating accelerant associated therewith includes from about 500 to about 7500 ppm by weight accelerant relative to the weight of the particles.

8. The method of claim 1, where said step of chlorinating the polyvinyl chloride resin particles includes adding chlorine to the water suspension containing the polyvinyl chloride particles suspended therein and then introducing an initiator.

9. The method of claim 1, where said step of chlorinating the polyvinyl chloride particles includes saturating the water with chlorine gas, and then introducing energy to the saturated water to thereby initiate the reaction of the chlorine with the polyvinyl chloride particles.

10. The method of claim 9, where said step of introducing energy includes introducing UV light.

11. The method of claim 1, where said step of associating the chlorination accelerant with the polyvinyl chloride particles includes adding the chlorination accelerant to the aqueous suspension, and allowing the chlorination accelerant and the polyvinyl chloride particles to associate for an association time of at least 10 minutes.

12. The method of claim 1, where the aqueous suspension of polyvinyl chloride particles includes less than 15 parts by weight vinyl chloride monomer per million parts by weight polyvinyl chloride particles.

13. The method of claim 1, where said step of chlorinating takes place at a temperature of from 10 to 95° C.

14. The method of claim 4, where the chlorinating accelerant is a poly(alkylene) oxide selected from the group consisting of poly(ethylene) oxide and poly(propylene) oxide.

* * * * *